(12) United States Patent
DeVerse et al.

(10) Patent No.: US 11,846,530 B2
(45) Date of Patent: Dec. 19, 2023

(54) METHOD AND DEVICE FOR MONITORING, DISPLAYING AND REMOTE REPORTING OF HOMOGENEOUS AND NON-HOMOGENEOUS TURBULENT MATERIAL FLOW STREAMS IN CONFINED CHANNELS AND PIPES

(71) Applicant: Fluidics Hawaii LLC, Kailua-Kona, HI (US)

(72) Inventors: Richard Andrew DeVerse, Kailua-Kona, HI (US); Mick Chavez-Pardini, Kamuela, HI (US)

(73) Assignee: Fluidics Hawaii LLC, Kailua-Kona, HI (US)

( * ) Notice: Subject to any disclaimer, the term of this patent is extended or adjusted under 35 U.S.C. 154(b) by 54 days.

(21) Appl. No.: 17/658,800

(22) Filed: Apr. 11, 2022

(65) Prior Publication Data

US 2022/0326055 A1    Oct. 13, 2022

Related U.S. Application Data

(60) Provisional application No. 63/258,123, filed on Apr. 12, 2021.

(51) Int. Cl.
*G01F 1/10* (2006.01)
*G01F 1/115* (2006.01)
*G01F 1/075* (2006.01)
*G01F 15/14* (2006.01)

(52) U.S. Cl.
CPC .............. *G01F 1/115* (2013.01); *G01F 1/075* (2013.01); *G01F 15/14* (2013.01)

(58) Field of Classification Search
CPC .......... G01F 1/115; G01F 1/075; G01F 15/14; G01F 1/28
See application file for complete search history.

(56) References Cited

U.S. PATENT DOCUMENTS 4,051,725 A    10/1977  Schloss
8,397,587 B2*   3/2013  Brill ......................... G01F 1/28
                                                      73/861.94

(Continued)

FOREIGN PATENT DOCUMENTS

GB      927299 A    5/1963
JP    S53-62559 A   6/1978

OTHER PUBLICATIONS

Search Report and Written Opinion in corresponding International Patent Application No. PCT/US2022/024287, dated Apr. 11, 2022, in 11 pages.

*Primary Examiner* — Francis C Gray
(74) *Attorney, Agent, or Firm* — Knobbe, Martens, Olson & Bear, LLP

(57) ABSTRACT

A method and device for accurately monitoring, displaying, and remote reporting of turbulent material flow streams in confined channels and pipes is provided. The device can have multiple cams coupled to an obstruction, and a spring. The multiple cams can have a cam profile, and the cam profile and the spring may be selected to linearize a rotation of the obstruction over a range of fluid flow velocities. The obstruction can include have multiple obstructions each in a different area of a cross-section of a pipe, improving the accuracy of the device.

19 Claims, 7 Drawing Sheets

(56) References Cited

U.S. PATENT DOCUMENTS

| | | | | |
|---|---|---|---|---|
| 8,800,473 B1* | 8/2014 | DeVerse | ............... | G01F 15/063 |
| | | | | 116/276 |
| 10,473,494 B2* | 11/2019 | Allen | ......................... | G01F 1/05 |
| 10,634,538 B2* | 4/2020 | Allen | ......................... | G01F 3/16 |

* cited by examiner

US 11,846,530 B2

METHOD AND DEVICE FOR MONITORING, DISPLAYING AND REMOTE REPORTING OF HOMOGENEOUS AND NON-HOMOGENEOUS TURBULENT MATERIAL FLOW STREAMS IN CONFINED CHANNELS AND PIPES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority under 35 U.S.C. § 119(e) to U.S. Provisional Application No. 63/258,123, filed Apr. 12, 2021, the entirety of which is incorporated by reference herein.

BACKGROUND

Field of the Invention

This invention generally relates to fluid flow sensing devices, and more particularly relates to a multi-obstruction device for accurately monitoring turbulent material flow streams in confined channels and pipes.

Description of the Related Art

Flow rates of fluids, gas, and loose solids are a measure of interest in plumbed, pumped, piped and channelized flow streams. In some plumbing systems, these flow streams may stretch over great distance and monitoring of the plumbing subsections can become difficult. Furthermore, these flow streams may comprise different flow rates across a cross section of the flow streams. Some areas of the flow stream may comprise homogeneous turbulent flow and other areas of the flow stream may comprise non-homogeneous turbulent flow. Conventional fluid flow sensors require extended linear channels or straight pipes to accurately measuring flow rate. Moreover, conventional mechanical fluid flow sensors typically only cover a portion of a cross-section of the flow stream so as not to affect the velocity of the flow stream. Therefore, a measurement of fluid velocity may not include turbulent portions of the flow stream, or a portion of the flow stream near the channel or pipe walls. The relationship between the flow stream velocity and movement of the fluid flow sensor are also not linear. Therefore, as the flow stream velocity increases, the accuracy of conventional mechanical fluid flow sensors significantly decreases.

SUMMARY

In some configurations, a fluid flow sensor adapted for measuring a fluid velocity over a range of fluid velocities may include: a plurality of cams; an obstruction member coupled to a first cam in the plurality of cams, wherein the obstruction member may be configured to rotate about the first cam relative to the fluid velocity; an arcuate appendage coupled to a second cam in the plurality of cams, wherein the arcuate appendage may be configured to rotate about the second cam; and a torsion spring coupled at least one of the plurality of cams, wherein the plurality of cams may be configured to convert a rotation of the obstruction member into a rotation of the arcuate appendage, and wherein the plurality of cams and the torsion spring may be configured to linearize a rotation of the arcuate appendage over the range of fluid velocities.

In some configurations, the fluid flow sensor, may include a second obstruction member coupled to the first cam, wherein the second obstruction member may be configured to rotate about the first cam relative to the fluid velocity, and wherein the plurality of cams may be configured to convert a rotation of the second obstruction member into a rotation of the arcuate appendage.

In some configurations, the fluid flow sensor, the plurality of cams may each include a cam profile.

In some configurations, the plurality of cams may each include a same cam profile.

In some configurations, the plurality of cams may each include a different cam profile.

In some configurations, the fluid flow sensor adapted for measuring a fluid velocity over a range of fluid velocities may include: an obstruction assembly including an obstruction member coupled to a first cam, wherein the obstruction member may be rotatable about the first cam; an indicator assembly including a torsion spring, a second cam and an arcuate appendage, wherein the arcuate appendage may be coupled to the second cam, and the torsion spring may provide a rotational force on the second cam, and wherein the arcuate appendage may be rotatable about the second cam; a linkage configured to couple the first cam to the second cam so the indicator assembly rotates when the obstruction assembly rotates; and an indicator lid, the indicator lid having an arcuate configuration forming an arcuate protruding upper portion, and includes a rim and a receiver pocket adapted for receiving at least a portion of the arcuate appendage, wherein when the arcuate appendage rotates, the arcuate appendage moves in an arcuate path inside the indicator lid, wherein the first cam may include a first cam profile, and the second cam may include a second cam profile, and wherein the first cam profile, the second cam profile, and the torsion spring may be configured to linearize a rotation of the arcuate appendage over the range of fluid velocities.

In some configurations, the first cam profile and the second cam profile may include a same profile.

In some configurations, the first cam profile and the second cam profile may include a different profile.

In some configurations, the torsion spring may include a non-linear spring.

In some configurations, the techniques described herein relate to a fluid flow sensor, wherein the torsion spring may include a linear spring.

In some configurations, the fluid flow sensor may include an array of magnetic sensors coupled to the indicator lid, and a magnet coupled to the arcuate appendage, wherein the array of magnetic sensors may convert a physical position of the magnet into a digital reading of the fluid velocity.

In some configurations, the fluid flow sensor may include an antenna configured to transmit the digital reading to an external device.

In some configurations, a physical position of the arcuate appendage inside the indicator lid may relate to the fluid velocity, and the fluid velocity may be indicated visually against a scale imprinted on the indicator lid.

In some configurations, the fluid flow sensor may be coupled to a display.

In some configurations, the display may be configured to display a turnover rate.

In some configurations, the fluid flow sensor adapted for measuring a fluid velocity over a range of fluid velocities may include: an obstruction assembly including a plurality of obstruction members coupled to a first cam, wherein the plurality of obstruction members may be rotatable about the first cam; an indicator assembly including a torsion spring, a second cam and an arcuate appendage, wherein the arcuate appendage may be coupled to the second cam, and the torsion spring provides a rotational force on the second cam, and wherein the arcuate appendage is rotatable about the second cam; a linkage configured to couple the first cam to the second cam so the indicator assembly rotates when the obstruction assembly rotates; and an indicator lid, the indicator lid having an arcuate configuration forming an arcuate protruding upper portion, and includes a rim and a receiver pocket adapted for receiving at least a portion of the arcuate appendage, wherein when the arcuate appendage rotates, the arcuate appendage moves in an arcuate path inside the indicator lid, wherein the first cam includes a first cam profile, and the second cam includes a second cam profile, and wherein the first cam profile, the second cam profile, and the torsion spring are configured to linearize a rotation of the arcuate appendage over the range of fluid velocities.

In some configurations, the fluid flow sensor may be coupled to a pipe.

In some configurations, the fluid flow sensor may be coupled to the pipe with a saddle clamp.

In some configurations, a cross-section of the pipe may include a plurality of zones, and each of the plurality of obstruction members may be configured to obstruct a fluid flow in different zones.

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

These and other features, aspects, and advantages of the present disclosure are described with reference to the drawings of certain embodiments, which are intended to schematically illustrate certain embodiments and not to limit the disclosure.

As described above, conventional fluid flow sensors require extended linear channels or straight pipes to accurately measuring flow rate. Moreover, conventional mechanical fluid flow sensors typically only cover a portion of a cross-section of the flow stream so as not to affect the velocity of the flow stream. Therefore, a measurement of fluid velocity may not include turbulent portions of the flow stream, or a portion of the flow stream near the channel or pipe walls. The relationship between the flow stream velocity and movement of the fluid flow sensor are also not linear. Therefore, as the flow stream velocity increases, the accuracy of conventional mechanical fluid flow sensors significantly decreases. Accordingly, there is a need for an improved fluid flow sensor that can measure the flow velocity of turbulent flows and linearize the relationship between flow stream velocity and the movement of the fluid flow sensor.

The present disclosure provides examples of an improved fluid flow sensor configured to linearize a rotation of an obstruction over a range of fluid velocities. The fluid flow sensor may also include an obstruction that improves accuracy of the fluid flow sensor.

Figure 1A:
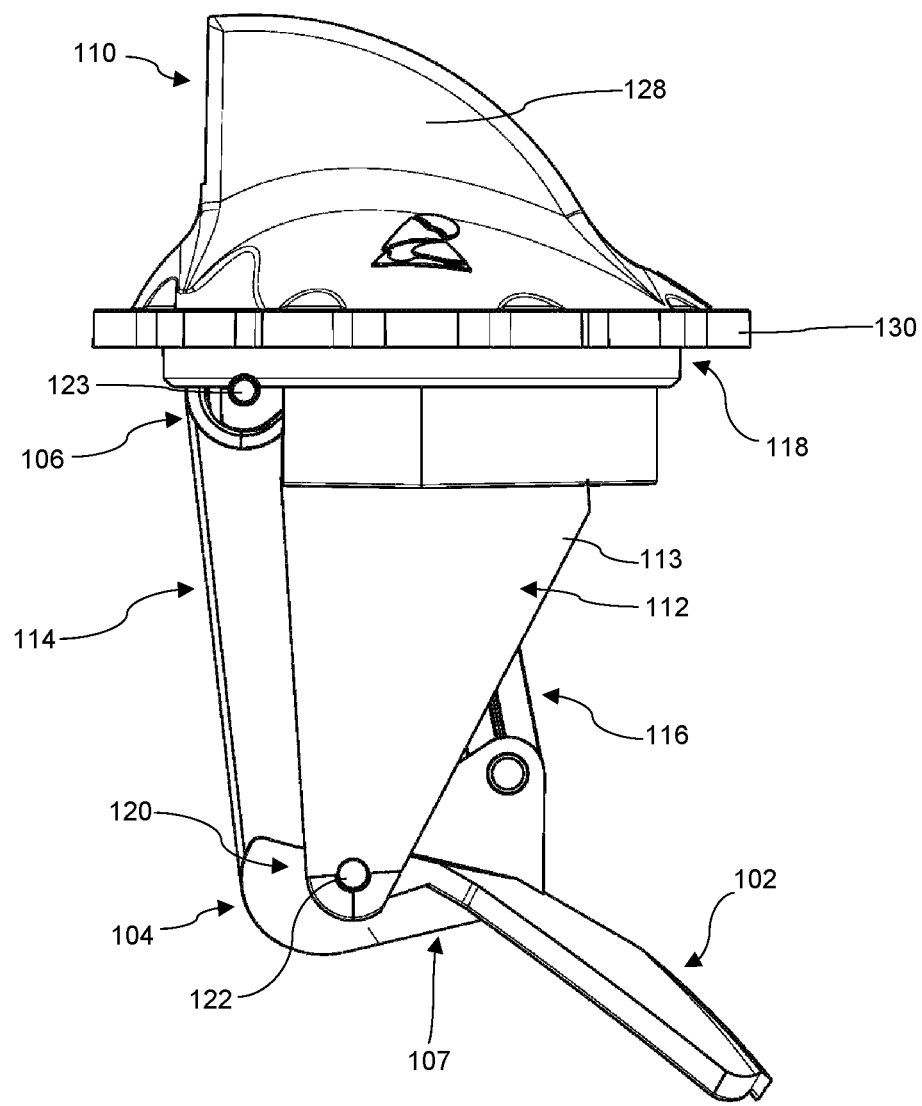
FIG. 1A illustrates an example of a flow sensor.
Figure 1B:
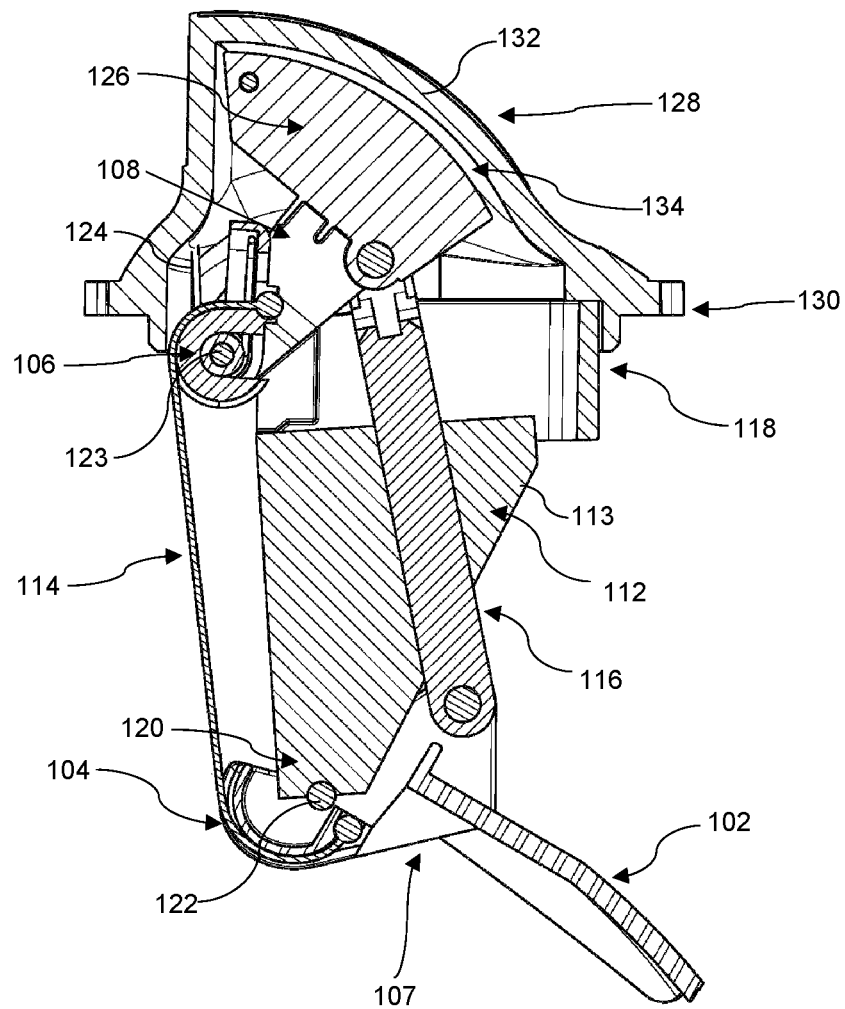
FIG. 1B illustrates a sectional view of an example of a flow sensor.

FIGS. 1A and 1B illustrate an example of a fluid flow sensor 100. The fluid flow sensor may include an obstruction member 102 (which may be a part of an obstruction assembly), a first cam 104, a second cam 106, an arcuate appendage 108, an indicator lid 110, a body 112, a first linkage 114, and a second linkage 116. The indicator lid 110 may be coupled to a top 118 of the body 112. The body 112 may include sidewalls 113. The first cam 104 may be rotatably coupled to the sidewalls 113 substantially near a bottom 120 of the body 112. The first cam 104 may be rotatably coupled to the body 112 by a first rotatable shaft 122. The obstruction member 102 may be coupled to a distal end 107 of the first cam 104 such that when a force or pressure is applied to the obstruction member 102, for example, a fluid flow, the obstruction member 102 and the first cam 104 rotate about the first rotatable shaft 122. In this way, the larger the force or pressure applied to obstruction member 102, the more the obstruction member 102 and the first cam 104 rotate about the first rotatable shaft 122. In some embodiments, an angle of rotation of the obstruction member 102 may depend on the pressure applied to the obstruction member 102.

In some embodiments, the second cam 106 may be rotatably coupled to the sidewalls 113 by a second rotatable shaft 123, substantially near the top 118 of the body 112. In some embodiments, the second cam 106 may be rotatably coupled to the body 112 anywhere on sidewalls 113 between the first cam 104 and the top 118 of the body 112. The second cam 106 may be coupled to the first cam 104 via a first linkage 114. The first linkage 114 may be a wire, a chain, a cable, or any other flexible linkage. The first linkage 114 may apply a rotational force to the second cam 106. In this way, when the first cam 104 rotates around the first rotatable shaft 122, the first cam 104 may pull on the first linkage 114, and the first linkage 114 may pull on the second cam 106, thereby rotating the second cam 106.

In some embodiments, fluid flow sensor 100 may include a spring 124 coupled to the second cam 106 (both of which, in addition to the arcuate appendage 108, may form an indicator assembly). The spring 124 may be a torsional spring (e.g., also referred to herein as a torsion spring), a tension spring, or a compression spring configured to provide a rotational force on the second cam 106. The spring 124 may be coupled to the second cam 106 such that when the second cam 106 rotates around the second rotatable shaft 123, the spring 124 provides a rotational force on the second cam 106. The rotational force provided by the spring 124 may counteract the rotation of the obstruction member 102, the first cam 104, and the second cam 106. In this way, when a force is applied to the obstruction member 102 by a fluid flow, the spring 124 will provide an opposing rotational force. In some embodiments, the spring 124 may be pre-loaded such that the obstruction member 102, the first cam 104, and the second cam 106 may not rotate until the fluid flow applies a force on the obstruction member 102 larger than the force applied by the spring 124. By preloading the spring 124, a minimum fluid velocity of the range of fluid velocities detected by the fluid flow sensor 100 may be adjusted. In some embodiments, the spring 124 may be coupled to the first cam 104.

In some embodiments, the fluid flow sensor may include multiple springs 124. In these embodiments, the multiple springs 124 may each be coupled to the second cam 106 in parallel or in series. In some embodiments, the multiple springs 124 may be coupled to the first cam 104. In some embodiments, one or more of the multiple springs 124 may be coupled to the first cam 104, and one or more of the multiple springs may be coupled to the second cam 106. In some embodiments, the multiple springs 124 may apply a force in the same direction. In some embodiments, the multiple springs 124 may apply a force in opposing directions.

In some embodiments, the second cam 106 may be coupled to an arcuate appendage 108. The arcuate appendage 108 may be coupled to the second cam 106 such that the arcuate appendage 108 rotates about the second rotatable shaft 123. The arcuate appendage 108 may be coupled to the second cam 106, or the arcuate appendage 108 may be coupled directly to the second rotatable shaft 123. The arcuate appendage 108 may include a protruding portion 126. The protruding portion 126 may extend from the second cam 106 out of the top 118 of the body 112. The protruding portion 126 may extend into the indicator lid 110. The protruding portion 126 may be configured such that as the fluid flow velocity increases, and the obstruction member 102 rotates, the protruding portion 126 may rotate about the second rotatable shaft 123 and further extends into the indicator lid 110.

In some embodiments, the fluid flow sensor 110 may include a second linkage 116. The second linkage may be coupled to the first cam 104 and the second cam 106, or the second linkage 116 may be coupled to the arcuate appendage 108 and the obstruction member 102. As shown in FIGS. 1A and 1B, the obstruction member 102 and the first cam 104 may rotate counterclockwise about the first rotatable shaft 122 as the fluid flow increases from left to right. As described above, the first linkage 114 may rotate both the second cam 106 and the arcuate appendage 108 counterclockwise about the second rotatable shaft 123 as the fluid flow increases. However, since the first linkage 114 may comprise a wire, a chain, a cable, or any other flexible linkage, the first linkage 114 may be unable transfer a rotational force applied by the spring 124 to the obstruction member 102 and the first cam 104. The second linkage 116 may be configured to transfer the rotational force applied by the spring 124 to the obstruction member 102 and the first cam 104.

In some embodiments, the first cam 104 and the second cam 106 may each comprise a cam profile. In some embodiments, the cam profiles of the first cam 104 and the second cam 106 may be circular. In some embodiments, the cam profiles may be elliptical or any other non-circular cam profile. Both the first cam 104 and the second cam 106 may comprise the same cam profile, or the first cam 104 and the second cam 106 may comprise different cam profiles. Cam profiles may be selected depending on a preferred flow velocity range, or rotational profile of the arcuate appendage 108.

In some embodiments, the cam profiles of the first cam 104 and the second cam 106 may be selected to alter the rotation of the obstruction member 102 and the arcuate appendage 108 relative to the fluid flow velocity. Different cam profiles may alter how much the obstruction member 102 and the arcuate appendage 108 rotate relative to each other.

In some embodiments, characteristics of the spring 124 may be selected to change the counter force provided by the spring 124. For example, a characteristic of the spring 124 may comprise a material, and depending on the material, the spring may provide a different counter force. A size and shape of the spring may also affect the counter force applied by the spring 124. In some embodiments, the spring 124 may be a liner spring or a non-linear spring. The material, the size, and the shape of the spring 124 may be selected depending on a preferred flow velocity range, a rotational profile of the arcuate appendage 108, and/or a rotational profile of the obstruction member 102.

In some embodiments, the cam profiles of the first cam 104 and the second cam 106, and the spring 124 may be configured to linearize the rotation of the arcuate appendage 108 over the preferred flow velocity range. In this way, as the fluid velocity increases linearly, an angle of rotation of the arcuate appendage 108 about the second rotatable shaft 123 may increase linearly. As an illustrative example, if the fluid velocity increases from 2 ft/s to 4 ft/s, the arcuate appendage 108 may rotate 10 degrees about the second rotatable shaft 123, and if the fluid velocity increases from 8 ft/s to 10 ft/s, the arcuate appendage 108 may again rotate 10 degrees about the second rotatable shaft 123. In some embodiments, the cam profiles of the first cam 104 and the second cam 106, and the spring 124 may be configured to linearize the rotation of the obstruction member 102 over the preferred flow velocity range. In this way, as the fluid velocity increases linearly, an angle of rotation of the obstruction member 102 about the first rotatable shaft 122 may increase linearly. For example, if the fluid velocity increases from 2 ft/s to 4 ft/s, the obstruction member 102 may rotate 10 degrees about the first rotatable shaft 122, and if the fluid velocity increases from 8 ft/s to 10 ft/s, the obstruction member 102 may again rotate 10 degrees about the second rotatable shaft 123. In any of these embodiments, a linear relationship between a change in fluid velocity and the rotation of the obstruction member 102 or the arcuate appendage 108 may increase the accuracy of the fluid flow sensor 100. Without a linear relationship, as the obstruction member 102 rotates about the first rotatable shaft, the obstruction member 102 may rotate less for the same change in fluid flow velocity. Therefore, detecting a small change in fluid flow velocity may be more difficult.

In some embodiments, as described above, the protruding portion 126 of the arcuate appendage 108 may extend into indicator lid 110. The indicator lid 110 may include an arcuate portion 128 (also referred to herein as an arcuate protruding upper portion 128) and a connector portion 130. The arcuate portion 128 may include a receiving pocket 134 with an arcuate configuration such that as the protruding portion 126 extends into the receiving pocket 134, the protruding portion 126 follows the same path as a top surface 132 of the receiving pocket 134. In some embodiments, the connector portion 130 may be rotatably coupled to the second rotatable shaft 123. In this way, a user may rotate the indicator lid 110 about the second rotatable shaft 123 in order to access an interior of the fluid flow sensor 100.

In some embodiments, the fluid flow sensor 100 may include acrylonitrile butadiene styrene (ABS), polyvinyl chloride (PVC), chlorinated polyvinyl chloride (CPVC), polycarbonate, stainless steel, aluminum, copper, brass, bronze, and/or any other corrosion resistant material.

Figure 2A:
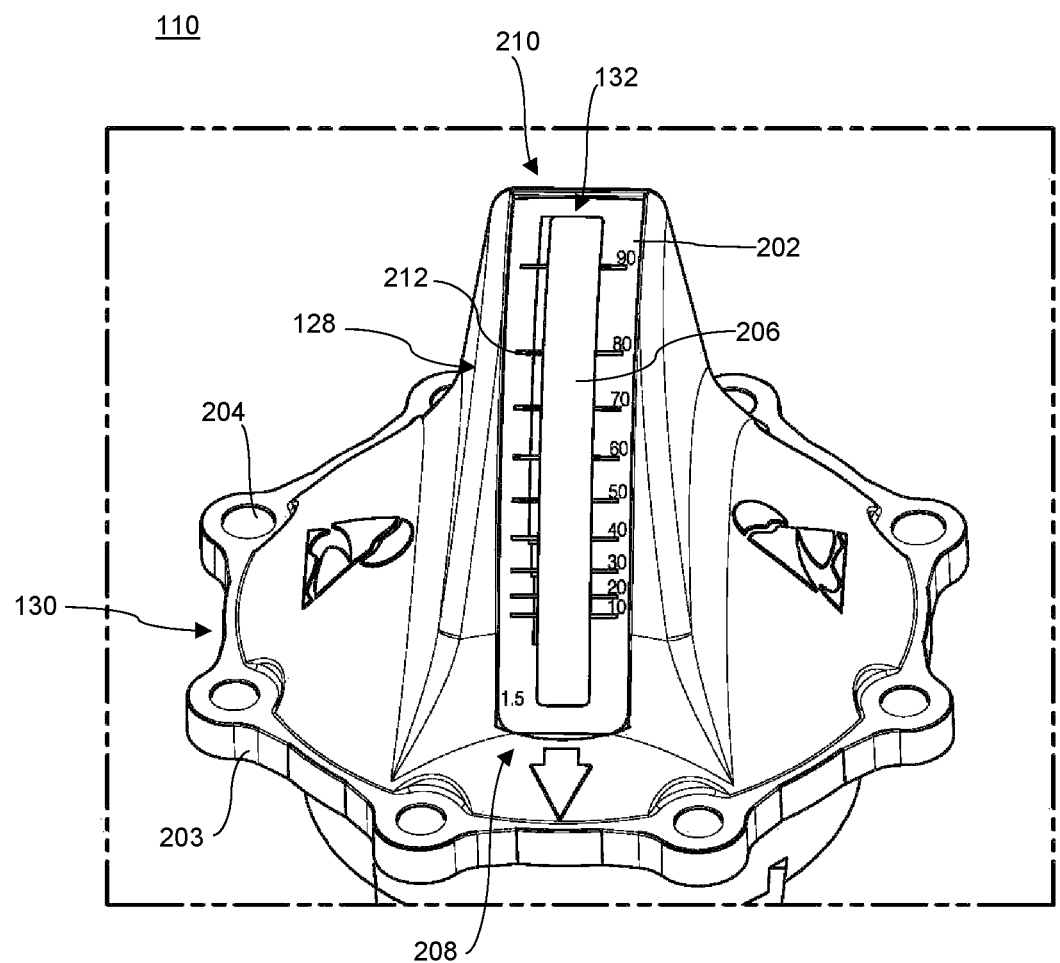
FIG. 2A illustrates an example of an indicator lid.

FIG. 2A illustrates an example of an indicator lid 110. As described above, the indicator lid 110 may include an arcuate portion 128 and a connector portion 130. The connector portion 130 may include a rim 203 with a plurality of holes 204. The plurality of holes 204 may be configured to receive a screw or other mechanical fastener in order to couple the indicator lid 110 and the fluid flow sensor 100 to a pipe, a channel, or other mechanism for transporting fluid. In some embodiments, the fluid flow sensor 100 may be coupled to a saddle clamp, and the saddle clamp may couple the fluid flow sensor 100 to the pipe or other mechanism for transporting fluid. The fluid flow sensor 100 may be coupled to a pipe such that the indicator lid 110 is outside of the pipe, and the obstruction member 102 is in the pipe, as further described below with reference to FIG. 3.

In some embodiments, the arcuate portion 128 may include a scale 202 for visually indicating the fluid flow velocity. The scale 202 may be printed or imprinted on the top surface 132. In some embodiments, the scale 202 is printed or imprinted on an inside of the top surface 132. In some embodiments, the scale 202 is printed or imprinted on the outside of the top surface 132. The scale 202 may be substantially the same size and shape as the top surface 132. In some embodiments, the scale 202 may include a slot 206. The slot 206 may be a portion of the scale 202 that is substantially see-through or transparent. The slot 206 may extend from a bottom 208 of the scale 202 to a top 210 of the scale. The slot 206 may allow a user to see the protruding portion 126 through the scale 202 and the top surface 132. In some embodiments, the scale 202 may include indicators 212. In some embodiments, the indicators 212 may correspond to a position of the protruding portion 126. The indicators 212 may relate a position of the protruding portion 126 to a fluid flow velocity. The indicators 212 may be printed on a portion of the scale 202 next to the slot 206, and the indicators 212 may be on either side of the slot 206. In this way, when a user looks through the slot 206 at a position of the protruding portion 126, the indicators 212 show a user to what fluid flow velocity the position of the protruding portion 126 relates. The indicators 212 on either side of the slot may include different units of measurement. For example, the indicators 212 to the right of the slot 206 may have units of ft/s, and the indicators 212 to the left of the slot 206 may have units of m/s. In some embodiments, the scale 202 may include any units of velocity or volumetric flow rate or any combination thereof.

In some embodiments, the top surface 132 may be substantially optically clear to allow a user to see the scale 202 and the protruding portion 126. In some embodiments, substantially the whole indicator lid 110 may be substantially optically clear.

Figure 2B:
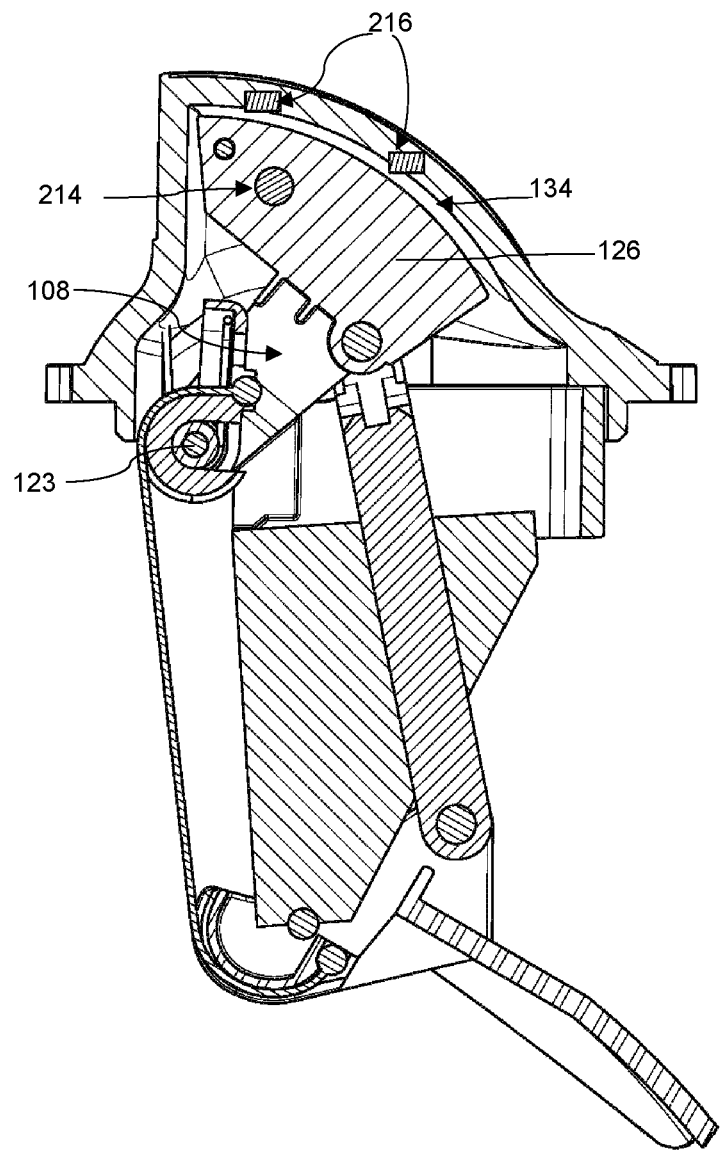
FIG. 2B illustrates an example of a flow sensor with a magnetic field sensor.

In some embodiments, as shown in FIG. 2B, the indicator lid may include one or more magnetic field sensors 216 (where the magnetic field sensors 216 may be referred to as an array of magnetic field sensors 216 if a plurality are present). The magnetic field sensor(s) 216 may be located on the arcuate portion 128 of the indicator lid 110. In these embodiments, the protruding portion 126 may include a magnet 214. As the protruding portion 126 and the magnet 214 physically move into the receiving pocket 134, the magnet 214 changes the magnetic field strength and direction of magnetic field lines of force relative to the magnetic field sensor(s) 216, which in turn changes the strength and orientation of the magnetic field and the alignment of the magnetic lines of force. The change in the strength and orientation of the magnetic field allows for the magnetic field sensor(s) 216 to detect a velocity by electromagnetic field detection methods. For example, the magnetic field sensor(s) 216 may be Hall Effect sensors. By using Hall effect sensors, fluid velocity may be measured by both strength of the magnetic field and the orientation of the magnetic field. As the arcuate appendage 108 rotates about the second rotatable shaft 123, so does the magnet 214 and the magnetic field. The magnetic field sensor(s) 216 may convert a physical position of the protruding portion 126 into an electrical signal. In some embodiments, the indicator lid 110 may include an optical sensor instead of magnetic field sensor(s) 216 in order to convert the physical position of the protruding portion 126 to an electrical signal.

Figure 2C:
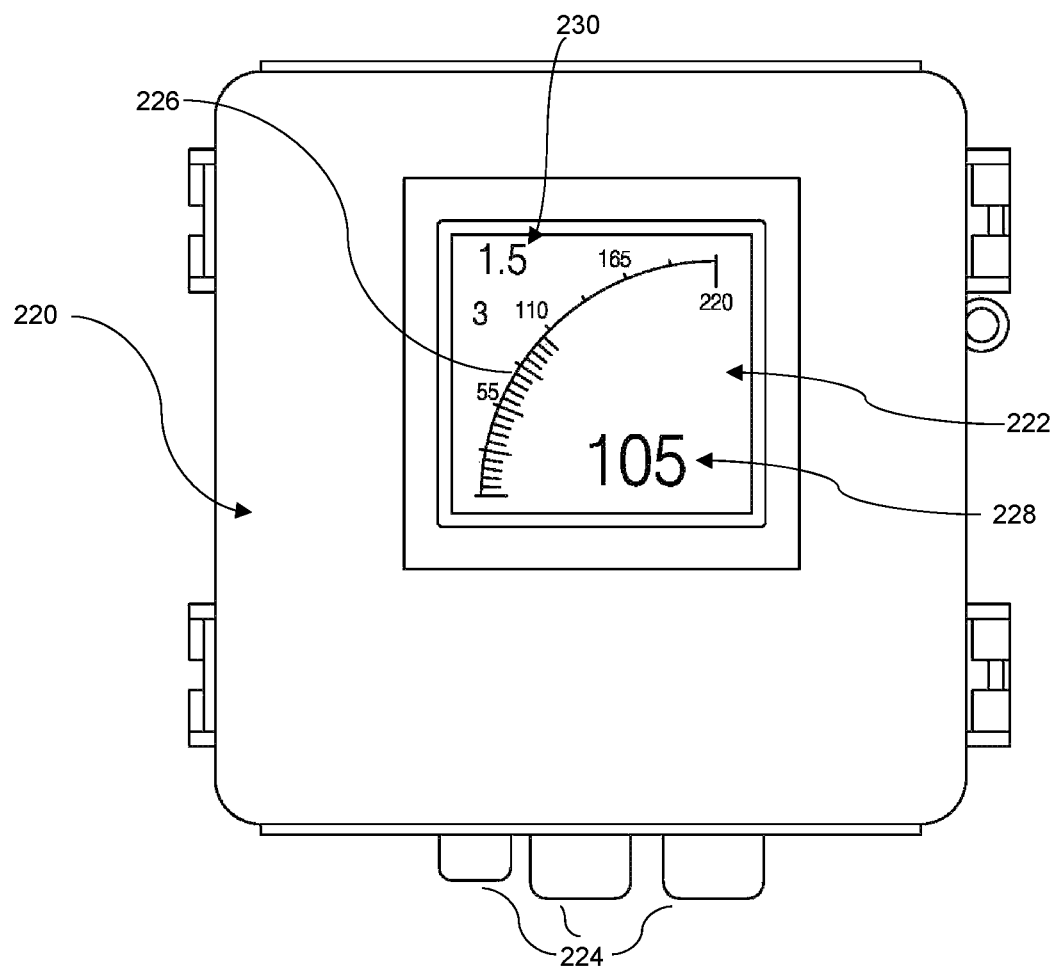
FIG. 2C illustrates an example of a digital indicator.

In some embodiments, the fluid flow sensor 100 may communicate with an external device, such as a mobile computing device, or a digital indicator 200, as shown in FIG. 2C. The digital indicator 200 may include a housing 220 and a screen 222. The screen 222 may be coupled to the housing 220. In some embodiments, the fluid flow sensor 100 may include wiring and/or an antenna configured to transmit the electrical signal to an external device. In these embodiments, the digital indicator 200 may include inputs 224. The inputs 224 may include a plug for wiring and/or a receiver (or transceiver). The wiring of the fluid flow sensor 100 may be coupled to the plug in order to transfer the electrical signal of the physical position of the protruding portion 126 to the digital indicator 200. Alternatively, the antenna of the fluid flow sensor 100 may communicate wirelessly with the receiver of the digital indicator 200 in order to transfer the electrical signal of the physical position of the protruding portion 126 to the digital indicator 200. The digital indicator 200 may include a processor (not shown) configured to convert the electrical signal received from the fluid flow sensor 100 into display information for the screen 222.

In some embodiments, the screen 222 may display information associated with the fluid flow. In some embodiments, the screen 222 may display a digital arcuate indicator 226. The digital arcuate indicator 226 may display the fluid flow velocity or volumetric flow rate. The digital arcuate indicator 226 may be a digital representation of the scale 202. In some embodiments, the screen 222 may display a fluid flow velocity number 228. The fluid flow velocity number 228 may include units of gallons per minute, gallons per second, liters per minute, liters per second, feet per second, meters per second, or any other velocity or volumetric flow rate. In some embodiments, the fluid flow velocity number 228 may correspond to the fluid flow velocity displayed on the digital arcuate indicator 226, or the fluid flow velocity number 228 may be an average fluid flow velocity over a period of time. The period of time may include 1 second, 5 seconds, 10 seconds, 15 seconds, 20 seconds, 30 seconds, 1 minute, 5 minutes, 10 minutes, 30 minutes, 1 hour, 2 hours, 3 hours, or any other period of time.

In some embodiments, the screen 222 may display a turnover rate (TOR) 230. In some embodiments, the TOR 230 may be the number of times an entire volume of fluid in a system passes through the system in a certain period of time. For example, the entire volume of fluid may pass through the system two and a half times time per hour, and the screen 222 may display the TOR 230 as 2.5. In some embodiments, the TOR 230 may be a time for the entire volume of fluid in the system to pass through the system. For example, the entire volume of fluid may pass through the system in an hour and a half, and the screen 222 may display the TOR as 1.5. In some embodiments, the volume of fluid in the system may be input by a user. In these embodiments, the fluid flow sensor 100 and/or the digital indicator may include a memory to store an input volume of fluid in the system. In some embodiments, the screen 222 may display the digital arcuate indicator 226, the fluid flow velocity number 228 and the TOR 230. Although the screen 222 is described in various embodiments as displaying the digital arcuate indicator 226, the fluid flow velocity number 228 and/or the TOR 230, the screen 222 may display any information associated with the fluid flow velocity without deviating from the scope of the present application.

In some embodiments, the digital indicator 200 may be coupled to the indicator lid 110, or on a pipe near the fluid flow sensor 100. In the embodiments where the digital indicator is coupled to the indicator lid 110, the digital indicator 200 may not have a housing. In these embodiments, the screen 222 may be coupled to the indicator lid 110.

In some embodiments, the fluid flow sensor 100 and/or the digital indicator 200 may include an alarm. The alarm may be coupled to the indicator lid 110 or the housing 220. In some embodiments, the alarm may notify the user if the flow rate is greater than a maximum flow rate. The maximum flow rate may be determined by municipal code or input by the user. In some embodiments, the alarm may notify the user if the flow rate is less than a minimum flow rate. The minimum flow rate may be determined by municipal code and optionally pre-coded or input by the user. In some embodiments, the alarm may notify the user if the flow rate is zero. In any of the embodiments with the alarm, the alarm may alert the user that something is wrong with the system, or the fluid flow sensor 100, such as an operating error, a malfunction, a power loss, etc.

Figure 3:
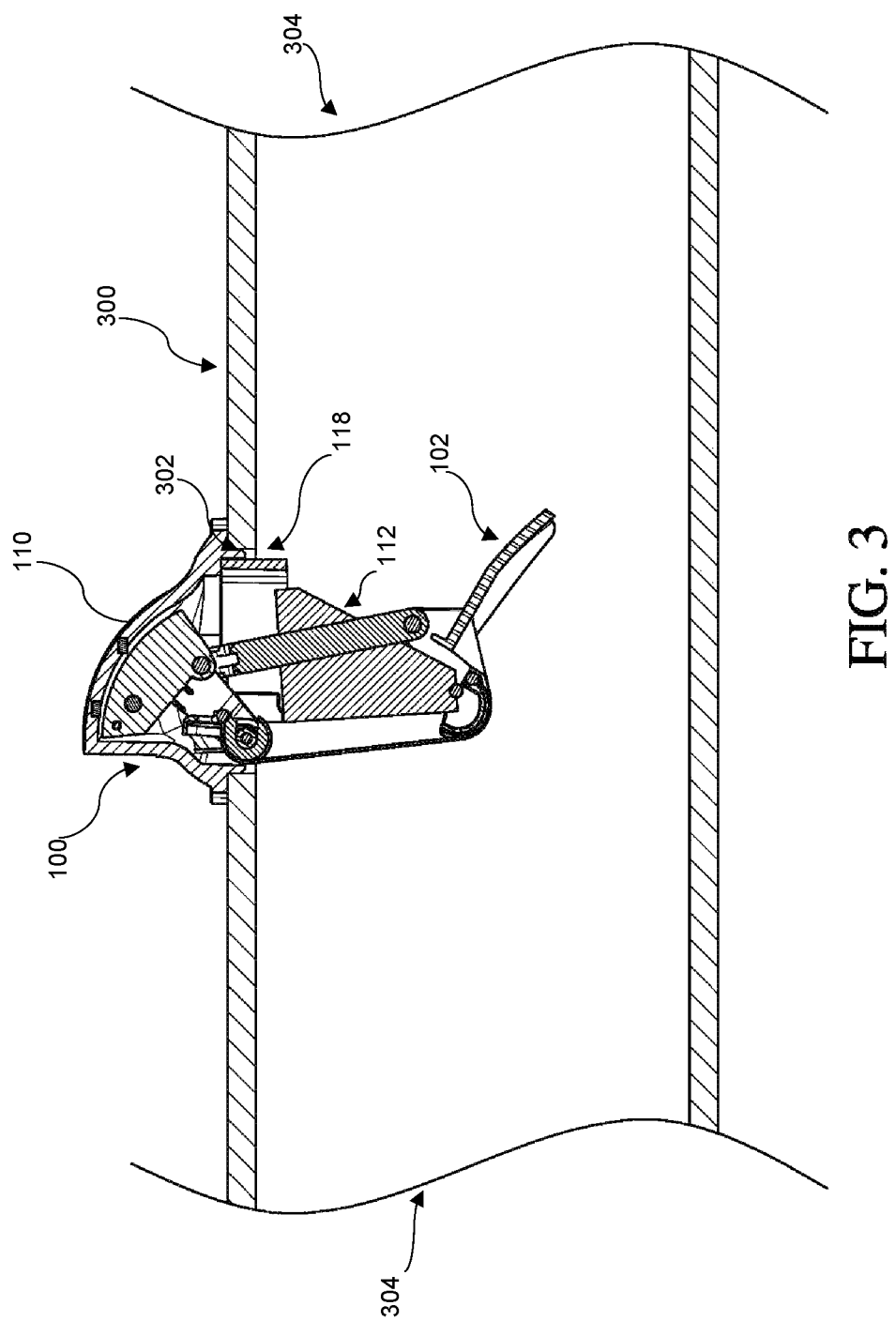
FIG. 3 illustrates an example of a flow sensor coupled to a pipe.

FIG. 3 illustrates an example of the fluid flow sensor 100 coupled to a pipe 400. As described above, the indicator lid 110 may include a plurality of holes 204 configured to receive a screw or other mechanical fastener in order to couple the fluid flow sensor 100 to a pipe or other mechanism for transporting fluid. As shown in FIG. 3 and described above in reference to FIGS. 1A and 1B, the fluid flow sensor 100 may be coupled to a pipe such that the indicator lid 110 is outside of the pipe, and substantially the rest of the fluid flow sensor 100 from the top 118 of the body 112 may be inserted through a hole 302 in the pipe and disposed inside of the pipe 300. Any amount of the fluid flow sensor 100 may be disposed inside of the pipe, as long as at least a portion of the obstruction member 102 is inside the pipe 300. In this way, the scale 202 may be read by a user when the fluid flow sensor 100 is coupled to a pipe 300. In some embodiments, the fluid flow sensor is built into the pipe 300. In these embodiments, ends of the pipe 304 may be coupled to portions of a pipe already part of a system of pipes. In other embodiments, the fluid flow sensor 100 may be coupled to an existing pipe with a saddle clamp.

Figure 4A:
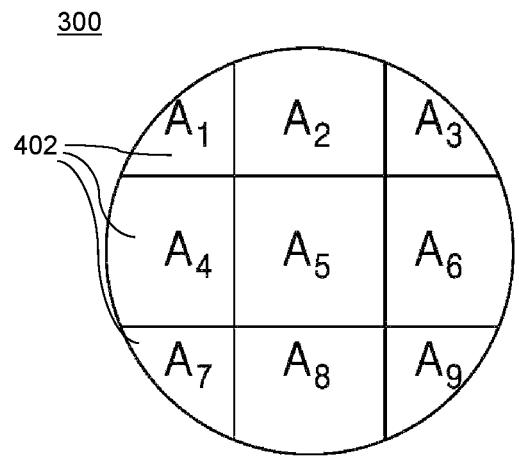
FIG. 4A illustrates a cross-section of a pipe divided into multiple areas.

FIG. 4A shows a cross-section of the pipe 300. As shown in FIG. 4A, the pipe 300 may be split into a number of areas 402. In one embodiment, the pipe 300 is split into nine areas 402 labelled $A_1$-$A_9$. Depending on the fluid, a size of the pipe 300, a shape of the pipe 300, a material of the pipe 300, an elevation of the pipe 300, an angle of the pipe 300, or other characteristics of the pipe 300, a flow in the different areas 402 may have different velocities. For example, due to friction from an inner surface of the pipe, fluid travelling through areas $A_1$, $A_2$, $A_3$, $A_4$, $A_6$, $A_7$, $A_8$, and $A_9$ may have a lower velocity than fluid travelling through area $A_5$. In some areas 402 of the pipe 300, the flow may be substantially laminar, and in other areas 402 of the pipe 300 the flow may be turbulent.

Figure 4B:
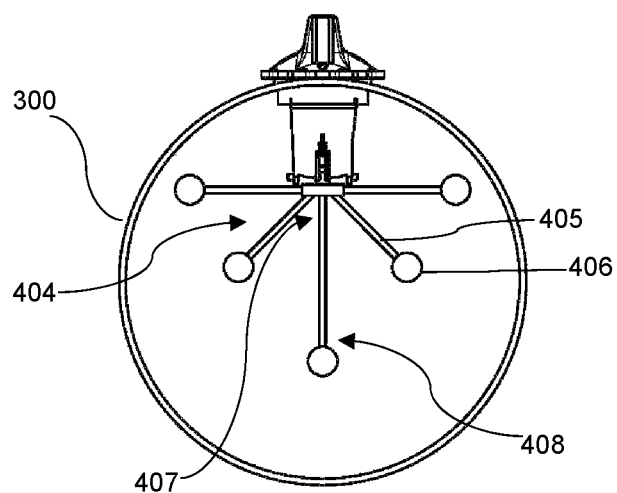
FIG. 4B illustrates an example of an obstruction of a flow sensor.

Since velocities and flow types may vary across different areas 402 of the pipe 300, an alternative obstruction member 404, shown in FIG. 4B, may provide more accurate measurements of flow velocity. The obstruction member 404 may include one or more extensions 405, and one or more obstructions 406. The extension(s) 405 may each include a proximal end 407 and a distal end 408. The proximal end 407 of an extension 405 may be coupled to the distal end 107 of the first cam 104. An obstruction 406 may be coupled to a distal end 408 of an extensions 405. The obstruction member 404 may be configured such that the obstruction(s) 406 are disposed in different areas 402 of the pipe 300. In this way, the obstruction member 404 covers more areas 402 than the obstruction member 102. Although the force acting on each obstruction 406 may be different due to a differing fluid flow velocity in different areas 402 of the pipe 300, an angle of rotation of the obstruction member 404 may be a function of a force applied over an area of the obstruction member 404. Therefore, the rotation of the obstruction member 404 relates to an average velocity of the fluid in the pipe 300. The obstruction member 404 with a plurality of obstructions 406 in different areas 402 of the pipe 300 may provide a more accurate measurement of the average fluid flow in the pipe 300. While FIG. 4B depicts the obstruction member 404 as including five extensions 405 and obstructions 406 being present, this is not meant to be limiting. The obstruction member 404 can include any number of extensions 405 and/or obstructions 406.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claim standing on its own to represent separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A fluid flow sensor adapted for measuring a fluid velocity over a range of fluid velocities, comprising:
   a plurality of cams;
   an obstruction member coupled to a first cam in the plurality of cams, wherein the obstruction member is configured to rotate about the first cam relative to the fluid velocity;
   an arcuate appendage coupled to a second cam in the plurality of cams, wherein the arcuate appendage is configured to rotate about the second cam; and
   a torsion spring coupled at least one of the plurality of cams,
   wherein the plurality of cams is configured to convert a rotation of the obstruction member into a rotation of the arcuate appendage, and wherein the plurality of cams and the torsion spring are configured to linearize a rotation of the arcuate appendage over the range of fluid velocities.

2. The fluid flow sensor of claim 1, further comprising a second obstruction member coupled to the first cam, wherein the second obstruction member is configured to rotate about the first cam relative to the fluid velocity, and wherein the plurality of cams is configured to convert a rotation of the second obstruction member into a rotation of the arcuate appendage.

3. The fluid flow sensor of claim 1, wherein the plurality of cams each comprise a cam profile.

4. The fluid flow sensor of claim 3, wherein the plurality of cams each comprise a same cam profile.

5. The fluid flow sensor of claim 3, wherein the plurality of cams each comprise a different cam profile.

6. A fluid flow sensor adapted for measuring a fluid velocity over a range of fluid velocities, comprising:
   an obstruction assembly comprising an obstruction member coupled to a first cam, wherein the obstruction member is rotatable about the first cam;
   an indicator assembly comprising a torsion spring, a second cam and an arcuate appendage, wherein the arcuate appendage is coupled to the second cam, and the torsion spring provides a rotational force on the second cam, and wherein the arcuate appendage is rotatable about the second cam;
   a linkage configured to couple the first cam to the second cam so the indicator assembly rotates when the obstruction assembly rotates; and
   an indicator lid, the indicator lid having an arcuate configuration forming an arcuate protruding upper portion, and comprises a rim and a receiver pocket adapted for receiving at least a portion of the arcuate appendage, wherein when the arcuate appendage rotates, the arcuate appendage moves in an arcuate path inside the indicator lid,
   wherein the first cam comprises a first cam profile, and the second cam comprises a second cam profile, and wherein the first cam profile, the second cam profile, and the torsion spring are configured to linearize a rotation of the arcuate appendage over the range of fluid velocities.

7. The fluid flow sensor of claim 6, wherein the first cam profile and the second cam profile comprise a same profile.

8. The fluid flow sensor of claim 6, wherein the first cam profile and the second cam profile comprise a different profile.

9. The fluid flow sensor of claim 6, wherein the torsion spring comprises a non-linear spring.

10. The fluid flow sensor of claim 6, wherein the torsion spring comprises a linear spring.

11. The fluid flow sensor of claim 6, further comprising an array of magnetic sensors coupled to the indicator lid, and a magnet coupled to the arcuate appendage, wherein the array of magnetic sensors convert a physical position of the magnet into a digital reading of the fluid velocity.

12. The fluid flow sensor of claim 11, further comprising an antenna configured to transmit the digital reading to an external device.

13. The fluid flow sensor of claim 6, wherein a physical position of the arcuate appendage inside the indicator lid relates to the fluid velocity, and the fluid velocity is indicated visually against a scale imprinted on the indicator lid.

14. The fluid flow sensor of claim 13, wherein the fluid flow sensor is coupled to a display.

15. The fluid flow sensor of claim 14, wherein the display is configured to display a turnover rate.

16. A fluid flow sensor adapted for measuring a fluid velocity over a range of fluid velocities, comprising:
an obstruction assembly comprising a plurality of obstruction members coupled to a first cam, wherein the plurality of obstruction members are rotatable about the first cam;
an indicator assembly comprising a torsion spring, a second cam and an arcuate appendage, wherein the arcuate appendage is coupled to the second cam, and the torsion spring provides a rotational force on the second cam, and wherein the arcuate appendage is rotatable about the second cam;
a linkage configured to couple the first cam to the second cam so the indicator assembly rotates when the obstruction assembly rotates; and
an indicator lid, the indicator lid having an arcuate configuration forming an arcuate protruding upper portion, and comprises a rim and a receiver pocket adapted for receiving at least a portion of the arcuate appendage, wherein when the arcuate appendage rotates, the arcuate appendage moves in an arcuate path inside the indicator lid,
wherein the first cam comprises a first cam profile, and the second cam comprises a second cam profile, and wherein the first cam profile, the second cam profile, and the torsion spring are configured to linearize a rotation of the arcuate appendage over the range of fluid velocities.

17. The fluid flow sensor of claim 16, wherein the fluid flow sensor is coupled to a pipe.

18. The fluid flow sensor of claim 17, wherein the fluid flow sensor is coupled to the pipe with a saddle clamp.

19. The fluid flow sensor of claim 17, wherein a cross-section of the pipe comprises a plurality of areas, and each of the plurality of obstruction members are configured to obstruct a fluid flow in different areas.

* * * * *